(12) United States Patent
Park et al.

(10) Patent No.: US 9,179,128 B2
(45) Date of Patent: Nov. 3, 2015

(54) IMAGE SENSING UNIT, 3D IMAGE PROCESSING APPARATUS, 3D CAMERA SYSTEM, AND 3D IMAGE PROCESSING METHOD

(71) Applicant: Samsung Display Co., Ltd., Yongin, Gyeonggi-do (KR)

(72) Inventors: Chan-Young Park, Yongin (KR); Ok-Keun Song, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 74 days.

(21) Appl. No.: 14/011,311

(22) Filed: Aug. 27, 2013

(65) Prior Publication Data

US 2014/0139636 A1   May 22, 2014

(30) Foreign Application Priority Data

Nov. 20, 2012   (KR) .................. 10-2012-0131869

(51) Int. Cl.
*H04N 13/02* (2006.01)
*H04N 5/369* (2011.01)

(52) U.S. Cl.
CPC ......... *H04N 13/0207* (2013.01); *H04N 5/3696* (2013.01)

(58) Field of Classification Search
CPC . H04N 13/0239; H04N 5/217; H04N 5/2251; H04N 5/23296; H04N 13/0207; H04N 5/225
USPC ............ 348/46, 345, 340, 351, 207.99, 219.1
See application file for complete search history.

(56) References Cited

U.S. PATENT DOCUMENTS

| 6,057,909 A | 5/2000 | Yahav et al. |
| 7,557,854 B2 * | 7/2009 | Hartlove et al. ............... 348/345 |
| 2010/0188483 A1 * | 7/2010 | Berger ............................ 348/46 |

FOREIGN PATENT DOCUMENTS

| JP | 2012-054856 A | 3/2012 |
| KR | 10-2011-0105720 A | 9/2011 |
| KR | 10-2012-0066500 A | 6/2012 |

* cited by examiner

*Primary Examiner* — Twyler Haskins
*Assistant Examiner* — Padma Haliyur
(74) *Attorney, Agent, or Firm* — Knobbe, Martens, Olson & Bear, LLP

(57) ABSTRACT

An image sensing unit is disclosed. In one aspect, the sensing unit includes optical sensors for acquiring a two dimensional (2D) image from a subject and micro-structures for supporting the optical sensors and adjusting the heights of the optical sensors.

10 Claims, 7 Drawing Sheets

211

IMAGE SENSING UNIT, 3D IMAGE PROCESSING APPARATUS, 3D CAMERA SYSTEM, AND 3D IMAGE PROCESSING METHOD

RELATED APPLICATIONS

This application claims priority to and the benefit of Korean Patent Application No. 10-2012-0131869 filed in the Korean Intellectual Property Office on Nov. 20, 2012, the entire contents of which are incorporated herein by reference.

BACKGROUND

1. Field

The described technology generally relates to an image sensing unit, a three dimensional (3D) image processing apparatus, a 3D camera system, and a 3D image processing method.

2. Description of the Related Technology

A 3D image display device provides different images to the left eye and the right eye of a user such that the user watches a stereoscopic image. The 3D image display device needs to use 3D image information obtained by a 3D camera system in order to generate a 3D image.

3D camera systems include a system using two cameras that respectively capture a left-view image and a right-view image and a system that records 3D image information by simultaneously acquiring 2D image information and distance information using a single camera.

The above information disclosed in this Background section is only for enhancement of understanding of the background of the described technology and therefore it may contain information that does not form the prior art that is already known in this country to a person of ordinary skill in the art.

SUMMARY

One inventive aspect is an image sensing unit including a micro-structure, a 3D image processing apparatus, a 3D camera system, and a 3D image processing method.

Another aspect is an image sensing unit, a 3D image processing apparatus, a 3D camera system, and a 3D image processing method having advantages of acquiring a 3D image from a 2D image obtained from a subject.

Another aspect is an image sensing unit for acquiring a 3D image from a 2D image obtained from a subject, a 3D image processing apparatus, a 3D camera system, and a 3D image processing method.

Another aspect is an image sensing unit including a plurality of optical sensors configured to obtain a two dimensional (2D) image from a subject; and a plurality of micro-structures configured to support the optical sensors and adjust heights of the optical sensors.

Each of the micro-structures may include a substrate, a first electrode located on the substrate, a first column extending upward in a first height from one end of the substrate adjacent to the first electrode, a second electrode extending from the end of the first column in the surface direction of the substrate, facing the first electrode and supporting the optical sensors, a second column spaced apart from the first column with the first electrode located between the second column and the first column, wherein the second column extends upward from the other end of the substrate in a second height greater than the first height, and a third electrode extending from the end of the second column in the surface direction of the substrate and facing the second electrode.

The end of the second electrode may be located between the first electrode and the third electrode and wherein the first electrode to the third electrodes are configured to receive voltages having different polarities.

The end of the second electrode is configured to move to the first electrode when voltages having different polarities are applied to the first electrode and the second electrode, and wherein the end of the second electrode is configured to move to the third electrode when voltages having different polarities are applied to the second electrode and the third electrode.

Another aspect is a three dimensional (3D) image processing apparatus including the image sensing unit comprising 1) a plurality of optical sensors configured to obtain a two dimensional (2D) image from a subject and 2) a plurality of micro-structures configured to support the optical sensors and adjust heights of the optical sensors; and, an image processor connected to the optical sensors and the micro-structures included in the image sensing unit, wherein the image processor is configured to drive the micro-structures to adjust the heights of the optical sensors to generate height information of the optical sensors and process a 2D image into a 3D image on the basis of the height information of the optical sensors.

The 3D image processing apparatus may further include an image storage unit connected to the image processor and storing the 3D image.

A third aspect of the present invention provides a three dimensional (3D) camera system including an image sensing unit comprising 1) a plurality of optical sensors configured to obtain a two dimensional (2D) image from a subject and 2) a plurality of micro-structures configured to support the optical sensors and adjust heights of the optical sensors; an image processor connected to the optical sensors and micro-structures included in the image sensing unit, wherein the image processor is configured to drive the micro-structures to adjust the heights of the optical sensors to generate height information of the optical sensors and process a 2D image into a 3D image on the basis of the height information of the optical sensors; and a lens assembly located between the 3D image processing apparatus and the subject, wherein the lens assembly is configured to magnify or reduce the 2D image of the subject, acquired by the optical sensors.

A fourth aspect of the present invention provides a three dimensional (3D) image processing method including: providing a 3D image processing apparatus, wherein the 3D image processing apparatus comprises i) an image sensing unit including 1) a plurality of optical sensors configured to obtain a two dimensional (2D) image from a subject and 2) a plurality of micro-structures configured to support the optical sensors and adjust heights of the optical sensors; and ii) an image processor connected to the optical sensors and micro-structures included in the image sensing unit, wherein the image processor is configured to drive the micro-structures to adjust the heights of the optical sensors to generate height information of the optical sensors and process a 2D image into a 3D image on the basis of the height information of the optical sensors; acquiring the 2D image; storing the 2D image; adjusting the heights of optical sensors included in the 3D image processing apparatus and comparing sensing values sensed by the optical sensors; and processing the 2D image into a 3D image on the basis of height information of the optical sensors.

The sensing values may correspond to the quantities of light sensed by the optical sensors.

The sensing values may correspond to focuses of the subject, sensed by the optical sensors.

DETAILED DESCRIPTION

Figure 1:
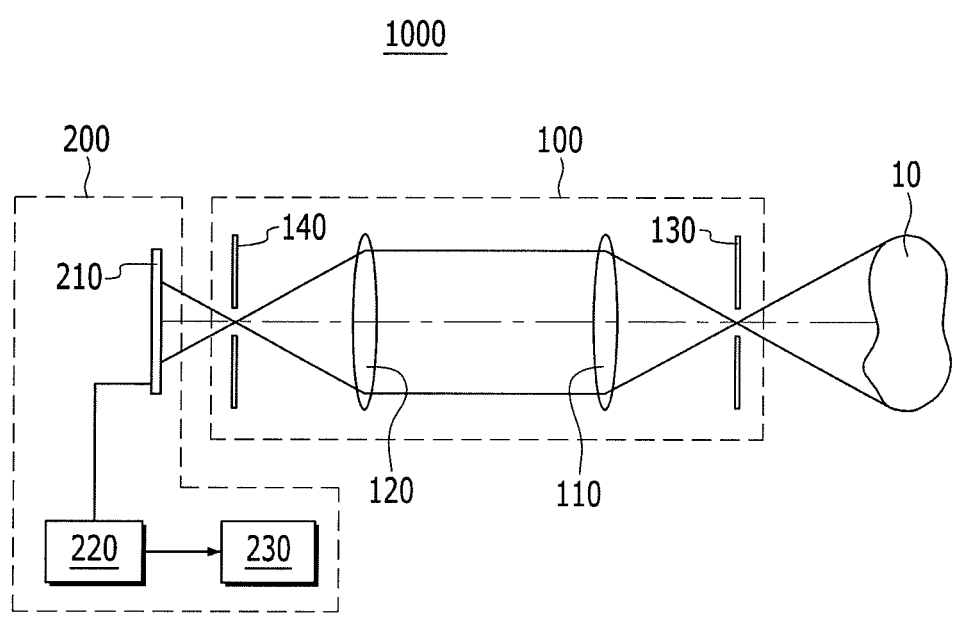
FIG. 1 shows a 3D camera system according to a first exemplary embodiment.

Embodiments will be described more fully hereinafter with reference to the accompanying drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In the drawings, dimensions and thicknesses of components are exaggerated, omitted or schematically illustrated for clarity and convenience of description. In addition, dimensions of constituent elements do not entirely reflect actual dimensions thereof.

In the drawings, the thickness of layers, films, panels, regions, etc., may be exaggerated for clarity. In addition, thicknesses of some layers and areas may be exaggerated for better understanding and ease of description. In the following description of the embodiments, it will be understood that, when an element such as a layer (film), region, pattern, or structure is referred to as being "on" or "under" another element, it can be "directly" on or under another element or can be "indirectly" formed such that an intervening element is also present. Also, terms such as "on" or "under" should be understood on the basis of the drawings.

In addition, unless explicitly described to the contrary, the word "comprise" and variations such as "comprises" or "comprising", will be understood to imply the inclusion of stated elements but not the exclusion of any other elements. Furthermore, the expression "on" or "under" may be used herein to represent the relationship of one element to another element as illustrated in the figures. It will be understood that this expression is intended to encompass different orientations of the elements in addition to the orientation depicted in the figures, namely, to encompass both "on" and "under".

A 3D camera system according to a first exemplary embodiment is described with reference to FIGS. 1 to 6. FIG. 1 shows a 3D camera system according to a first exemplary embodiment.

As shown in FIG. 1, a 3D camera system 1000 acquires a 3D image from a subject 10 and includes a lens assembly 100 and a 3D image processing apparatus 200.

The lens assembly 100 is located between the 3D image processing apparatus 200 and the subject 10 in front of the 3D image processing apparatus 200 and magnifies or reduces a two dimensional (2D) image acquired by the 3D image processing apparatus 200. The lens assembly 100 includes a condensing lens 110 located near the subject 10, a focusing lens 120 arranged near the 3D image processing apparatus 200, a first diaphragm 130 located between the condensing lens 110 and the subject 10, and a second diaphragm 140 located between the focusing lens 120 and the 3D image processing apparatus 200. The lens assembly 100 may further include a plurality of lenses in addition to the condensing lens 110 and the focusing lens 120.

The 3D image processing apparatus 200 processes the 2D image magnified or reduced by the lens assembly 100 into a 3D image and stores the 3D image. The 3D image processing apparatus 200 includes an image sensing unit 210, an image processor 220 and an image storage unit 230.

The image sensing unit 210 may include a plurality of height-controllable optical sensors. The image sensing unit 210 will be described later.

The image processor 220 is connected to the image sensing unit 210 and drives micro-structures included in the image sensing unit 210 to adjust the heights of the optical sensors so as to generate height information of the optical sensors. In addition, the image processor 220 processes a 2D image of the subject 10, acquired by the optical sensors, into a 3D image on the basis of the height information of the optical sensors, which is adjusted by the micro-structures. The image processor 220 drives the micro-structures such that the optical sensors acquire an optimum 2D image and generates height information of the optical sensors when the optical sensors acquire the optimum 2D image. The optimum 2D image may correspond to an optimum quantity of light sensed by the optical sensors and an optimum focus of the subject. The image storage unit 230 is connected to the image processor 220 and stores the 3D image obtained by the image processor 220.

Figure 2:
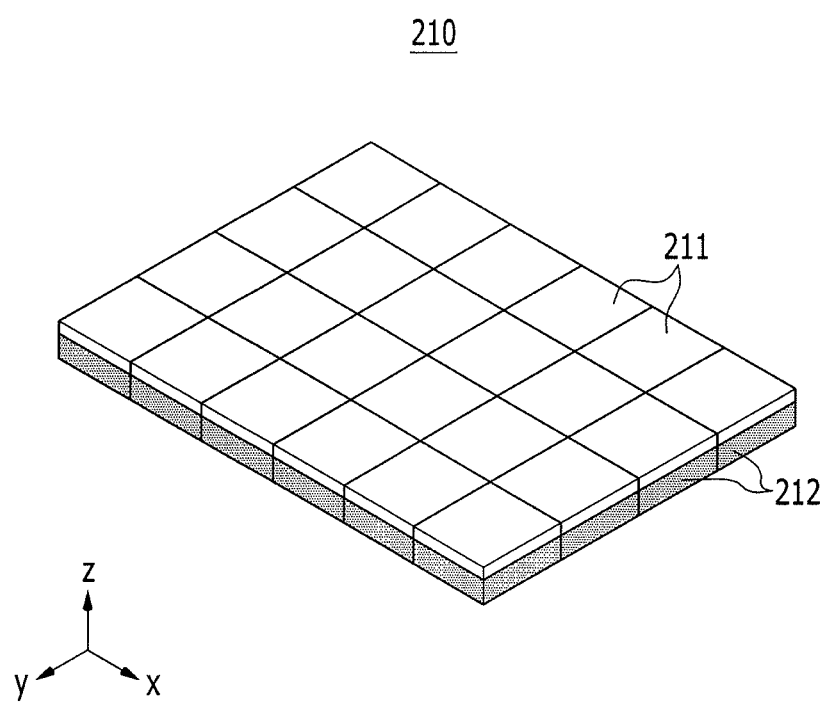
FIG. 2 is a perspective view of an image sensing unit shown in FIG. 1.

FIG. 2 is a perspective view of the image sensing unit shown in FIG. 1. In one embodiment, as shown in FIG. 2, the image sensing unit 210 includes a plurality of optical sensors 211 for acquiring a 2D image from the subject 10 and a plurality of micro-structures 212 respectively located under the optical sensors 211 and driven by the image processor 220 to control the heights of the optical sensors 211.

Each optical sensor 211 and each micro-structure 212 forms a single pixel and a plurality of pixels are arranged in x-axis and y-axis direction to form a pixel array such that the plurality of optical sensors 211 acquires the 2D image of the subject 10.

The optical sensors 211 may be implemented as charge-coupled devices (CCDs) or complementary metal-oxide semiconductor (CMOS) devices. The micro-structures 212 may be implemented as micro electro mechanical systems (MEMS) structures or piezoelectric elements.

Figure 3:
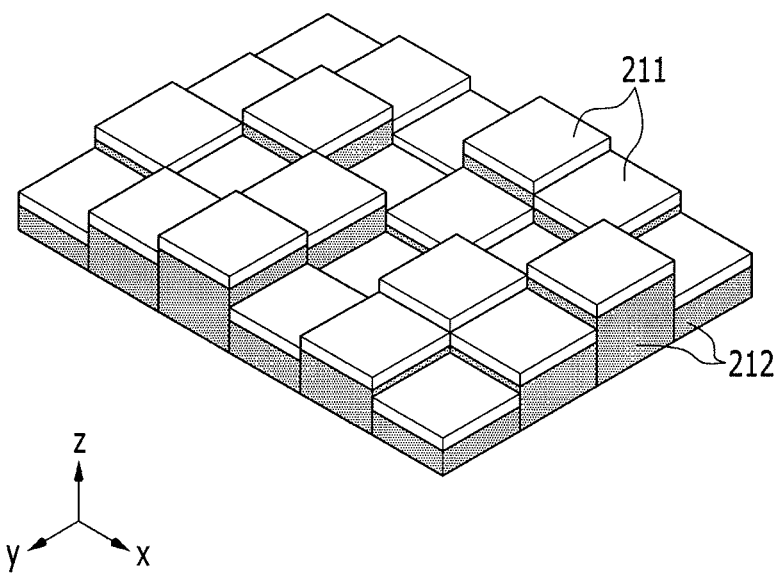
FIG. 3 is a perspective view of the image sensor unit shown in FIG. 2 after heights of optical sensors are changed.

FIG. 3 is a perspective view of the image sensing unit shown in FIG. 2 after the heights of the optical sensors are adjusted. As shown in FIG. 2, all the optical sensors 211 initially have the same height. Referring to FIG. 3, the heights of the optical sensors 211 are changed according to operation of the micro-structures 212.

Figure 4:
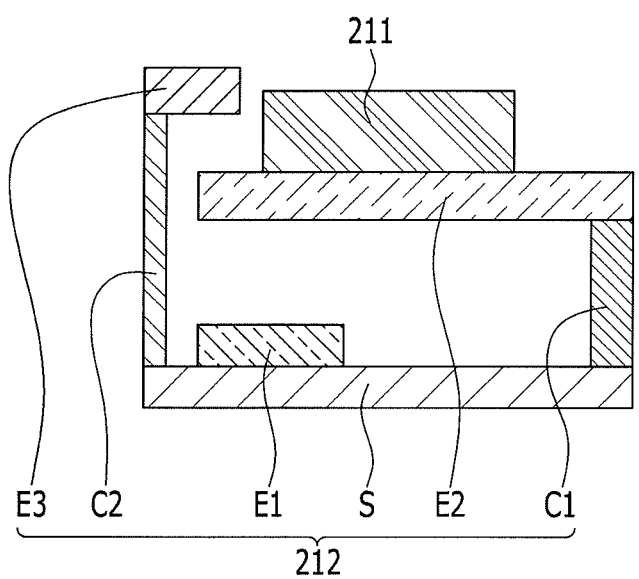
FIG. 4 is a cross-sectional view of the image sensing unit shown in FIG. 2.

A change in the heights of the optical sensors 211 according to the micro-structures 212 will now be described with reference to FIGS. 4, 5 and 6. FIG. 4 is a cross-sectional view of the image sensing unit shown in FIG. 2.

As shown in FIG. 4, the optical sensor 211 is supported by the micro-structure 212. The micro-structure 212 includes a substrate S, a first electrode E1, a first column C1, a second electrode E2, a second column C2, and a third electrode E3.

The first electrode E1, the first column C1, the second electrode E2, the second column C2, and the third electrode E3 are located on the substrate S. The substrate S may be formed of an insulating material such as silicon.

The first electrode E1 is located on the substrate S and is in neighborhood with the second column C2. The first column C1 is extended upward in a first height from one end of the substrate S in neighborhood with the first electrode E1.

The second electrode E2 is extended from the end of the first column C1 in the surface direction of the substrate S, faces the first electrode E1 and supports the optical sensor 211. The second column C2 is spaced apart from the first column C1 with the first electrode E1 located between the first and second columns C1 and C2 and extended upward from the other end of the substrate S in a second height greater than the first height. The third electrode E3 is extended from the end of the second column C2 in the surface direction of the substrate S and faces the second electrode E2.

According to the above-described structure, the end of the second electrode E2 is located between the first electrode E1 and the third electrode E3 and, when voltages having different polarities are selectively applied to the first electrode E1, the second electrode E2 and the third electrode E3, the end of the second electrode E2 moves to the first electrode E1 or the third electrode E3 to adjust the height of the optical sensor 211 supported by the second electrode E2. The first electrode E1, the second electrode E2 and the third electrode E3 are connected to the image processor 220 and may be provided with voltages having different polarities from the image processor 220.

Figure 5:
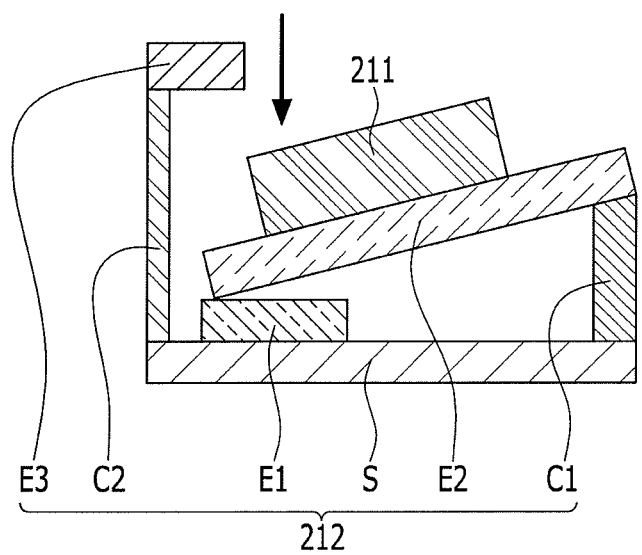
FIGS. 5 and 6 are cross-sectional views illustrating a change of the heights of the optical sensors in the image sensing unit shown in FIG. 4.
Figure 6:
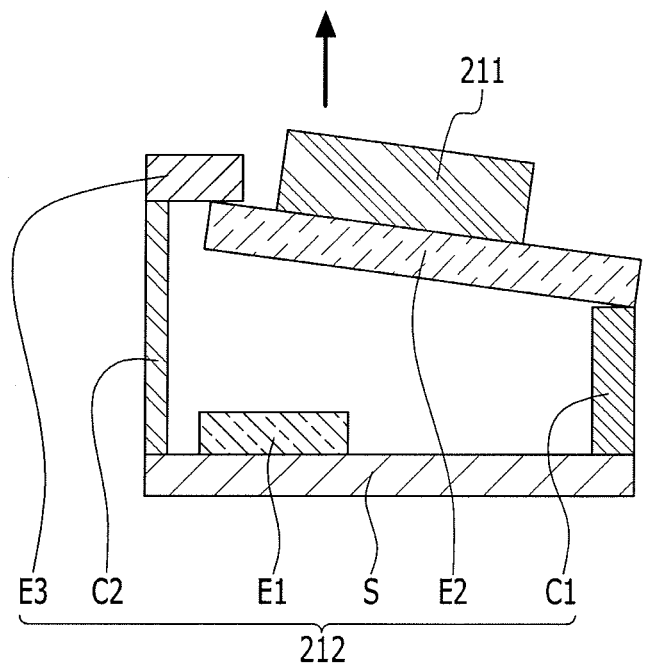

FIGS. 5 and 6 are cross-sectional views illustrating a height change of the optical sensor in the image sensing unit shown in FIG. 4. For example, as shown in FIG. 5, when a negative voltage is applied to the first electrode E1, a positive voltage is applied to the second electrode E2 and no voltage is applied to the third electrode E3 from the image processor 220, electrostatic force is generated between the first electrode E1 and the second electrode E2, and thus the end of the second electrode E2 moves downward to the first electrode E1. Accordingly, the height of the optical sensor 211 supported by the second electrode E2 is decreased.

Referring to FIG. 6, when a negative voltage is applied to the third electrode E3, a positive voltage is applied to the second electrode E2 and no voltage is applied to the first electrode E1 from the image processor 220, electrostatic force is generated between the second electrode E2 and the third electrode E3, and thus the end of the second electrode E2 moves upward to the third electrode E1. Accordingly, the height of the optical sensor 211 supported by the second electrode E2 is increased.

As described above, in the 3D image camera system 1000 according to the first exemplary embodiment, the image processor 220 is connected to the image sensing unit 210 and drives the micro-structures 212 included in the image sensing unit 210 to adjust the heights of the micro-structures 211 so as to generate height information of the optical sensors 211. In addition, the image processor 220 processes a 2D image of the subject 10, acquired by the optical sensors 211, into a 3D image on the basis of the height information of the optical sensors 211.

A description will be given of a 3D image processing method according to a second exemplary embodiment with reference to FIGS. 1 to 7. The 3D image processing method according to the second exemplary embodiment can be performed using the 3D image camera according to the first exemplary embodiment.

Figure 7:
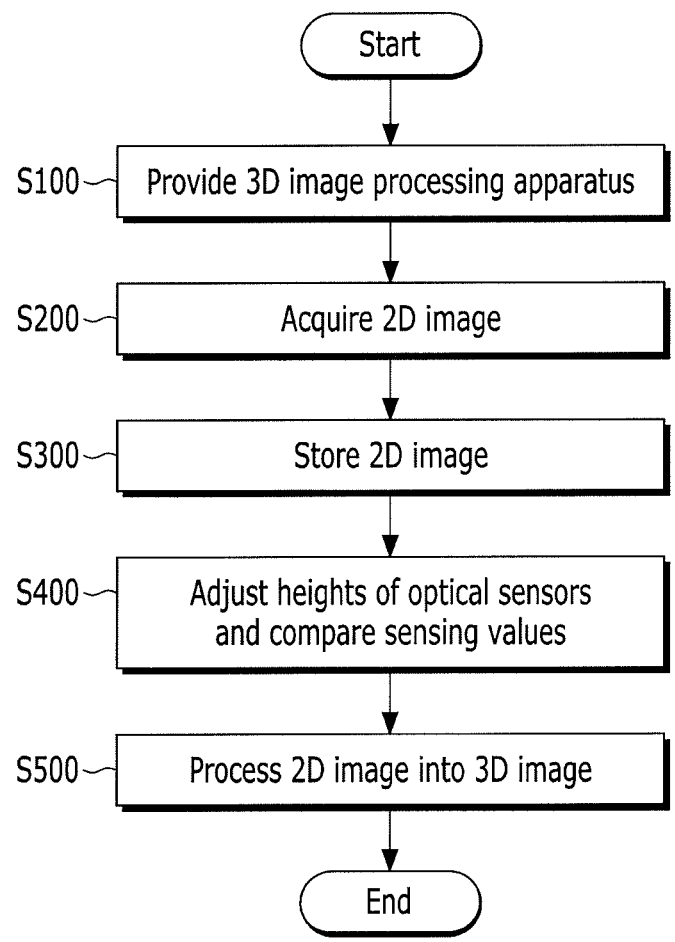
FIG. 7 is a flowchart illustrating a 3D image processing method according to a second exemplary embodiment.

FIG. 7 is a flowchart illustrating the 3D image processing method according to the second exemplary embodiment. As shown in FIGS. 1 to 7, the above-mentioned 3D image processing apparatus 200 is provided (S100).

Specifically, the 3D image camera system 1000 including the lens assembly 100 and the 3D image processing apparatus 200 is provided. Then, a 2D image is acquired (S200). In one embodiment, the optical sensors 211 which constitute the image sensing unit 210 are located at the same level and a 2D image is acquired from the subject 10. Subsequently, the 2D image is stored (S300).

In one embodiment, the 2D image obtained by the optical sensors 211 is transmitted to the image processor 220 and stored as an initial value of the 2D image.

Then, the heights of the optical sensors are adjusted and sensing values sensed by the optical sensors are compared (S400). In one embodiment, sensing values of the optical sensors 211 of pixels are compared while the micro-structures 212 that form the pixels are moved up and down.

For example, a change in the quantity of light sensed by the optical sensor 211 of each pixel is detected and the height of the optical sensor 211 is adjusted to a position at which each pixel senses a maximum quantity of light. The optical sensors 211 of the respective pixels are finally arranged in a structure having an uneven surface, as shown in FIG. 3. Here, height information of the optical sensors 211 of the pixels is stored.

Alternatively, an optimum focal position of the subject 10 is sensed by the optical sensors 211 as a sensing value and the heights of the optical sensors 211 are adjusted such that the 2D image of the subject 10 is focused in an optimum state.

In this case, it is possible to adjust the optimum focal position while watching an image displayed on a screen. Alternatively, it is possible to obtain the optimum focal position according to a previously input algorithm.

The heights of the optical sensors 211 according to the optimum focal position can be adjusted in consideration of aberrations of the lenses included in the lens assembly 100. In one embodiment, aberration values set to the lens are input to the image processor 220 in advance for each pixel and the height of the optical sensor 211 of each pixel is adjusted such that the aberration values become minimum values. Then, the 2D image is processed into a 3D image on the basis of the height information of the optical sensors (S500).

Specifically, the height information of the optical sensors 211 is compared to the previously stored initial value of the 2D image, a difference between the height information and the initial value and the 2D image are simultaneously stored. Accordingly, the height information of the optical sensor 211 of each pixel corresponds to depth information of the image, and the 3D image is stored in the image storage unit 230. The 3D image may be stored in the image storage unit 230 in such a manner that the 2D image and depth information of each pixel are separately stored and matched to each other or the 2D image and the depth information are simultaneously stored in one file.

As described above, the 3D image processing method according to the second exemplary embodiment acquires the 3D image from the 2D image by processing the 2D image into the 3D image on the basis of the height information of the optical sensors 211.

According to at least one of the disclosed embodiments, an image sensing unit can acquire a 3D image from a 2D image obtained from a subject.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims.

What is claimed is:

1. An image sensing unit, comprising:
 a plurality of optical sensors configured to obtain a two dimensional (2D) image from a subject; and a plurality of micro-structures configured to support the optical sensors and adjust heights of the optical sensors based on electrostatic force applied thereto, wherein each of the micro-structures comprises a plurality of electrodes, and wherein the micro-structures are configured to adjust the heights of the optical sensors based on electrostatic force applied to the electrodes.

2. An image sensing unit, comprising:
a plurality of optical sensors configured to obtain a two dimensional (2D) image from a subject; and
a plurality of micro-structures configured to support the optical sensors and adjust heights of the optical sensors,
wherein each of the micro-structures comprises:
a substrate;
a first electrode located on the substrate;
a first column extending upward in a first height from one end of the substrate adjacent to the first electrode;
a second electrode extending from the end of the first column in the surface direction of the substrate, facing the first electrode and supporting the optical sensors;
a second column spaced apart from the first column with the first electrode located between the second column and the first column, wherein the second column extends upward from the other end of the substrate in a second height greater than the first height; and
a third electrode extending from the end of the second column in the surface direction of the substrate and facing the second electrode.

3. The image sensing unit of claim 2, wherein the end of the second electrode is located between the first electrode and the third electrode and wherein the first to third electrodes are configured to receive voltages having different polarities.

4. The image sensing unit of claim 3, wherein the end of the second electrode is configured to move to the first electrode when voltages having different polarities are applied to the first electrode and the second electrode, and wherein the end of the second electrode is configured to move to the third electrode when voltages having different polarities are applied to the second electrode and the third electrode.

5. A three dimensional (3D) image processing apparatus, comprising:
an image sensing unit comprising 1) a plurality of optical sensors configured to obtain a two dimensional (2D) image from a subject and 2) a plurality of micro-structures configured to support the optical sensors and adjust heights of the optical sensors based on electrostatic force applied thereto; and
an image processor connected to the optical sensors and micro-structures included in the image sensing unit, wherein the image processor is configured to drive the micro-structures to adjust the heights of the optical sensors to generate height information of the optical sensors and process a 2D image into a 3D image on the basis of the height information of the optical sensors,
wherein each of the micro-structures comprises a plurality of electrodes, and wherein the micro-structures are configured to adjust the heights of the optical sensors based on electrostatic force applied to the electrodes.

6. The 3D image processing apparatus of claim 5, further comprising an image storage unit connected to the image processor and storing the 3D image.

7. A three dimensional (3D) camera system, comprising:
an image sensing unit comprising 1) a plurality of optical sensors configured to obtain a two dimensional (2D) image from a subject and 2) a plurality of micro-structures configured to support the optical sensors and adjust heights of the optical sensors based on electrostatic force applied thereto;
an image processor connected to the optical sensors and micro-structures included in the image sensing unit, wherein the image processor is configured to drive the micro-structures to adjust the heights of the optical sensors to generate height information of the optical sensors and process a 2D image into a 3D image on the basis of the height information of the optical sensors; and
a lens assembly located between the 3D image processing apparatus and a subject, wherein the lens assembly is configured to magnify or reduce a 2D image of the subject, acquired by the optical sensors included in the 3D image processing apparatus,
wherein each of the micro-structures comprises a plurality of electrodes, and wherein the micro-structures are configured to adjust the heights of the optical sensors based on electrostatic force applied to the electrodes.

8. A three dimensional (3D) image processing method, comprising:
providing a 3D image processing apparatus, wherein the 3D image processing apparatus comprises i) an image sensing unit including 1) a plurality of optical sensors configured to obtain a two dimensional (2D) image from a subject and 2) a plurality of micro-structures configured to support the optical sensors and adjust heights of the optical sensors; and ii) an image processor connected to the optical sensors and micro-structures included in the image sensing unit, wherein the image processor is configured to drive the micro-structures to adjust the heights of the optical sensors to generate height information of the optical sensors and process a 2D image into a 3D image on the basis of the height information of the optical sensors;
acquiring a 2D image of a subject;
storing the 2D image;
adjusting the heights of optical sensors included in the 3D image processing apparatus and comparing sensing values sensed by the optical sensors; and
processing the 2D image into a 3D image on the basis of height information of the optical sensors.

9. The 3D image processing method of claim 8, wherein the sensing values correspond to the quantities of light sensed by the optical sensors.

10. The 3D image processing method of claim 8, wherein the sensing values correspond to focuses of the subject, sensed by the optical sensors.

* * * * *